July 18, 1944.    J. W. SHIELDS    2,354,069
REPAIR DEVICE
Filed April 21, 1943
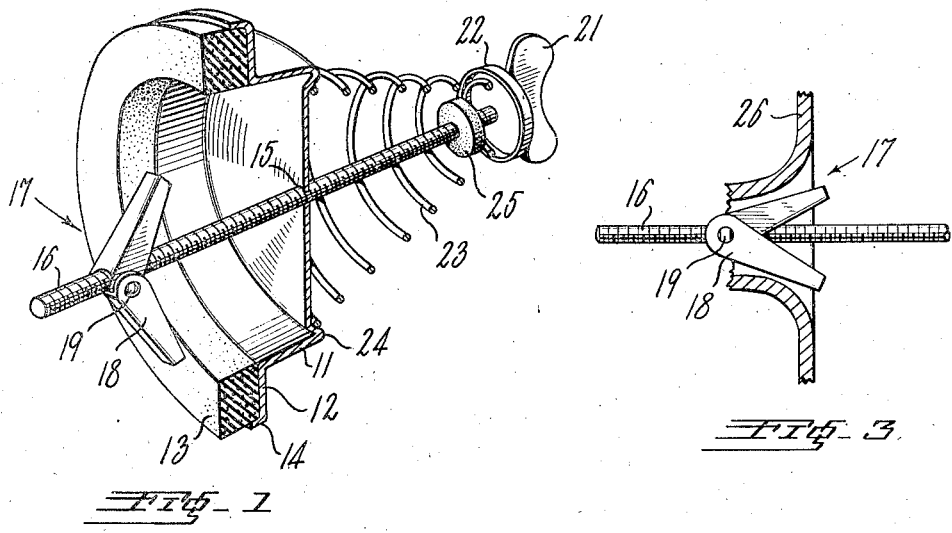
Fig. 1
Fig. 3
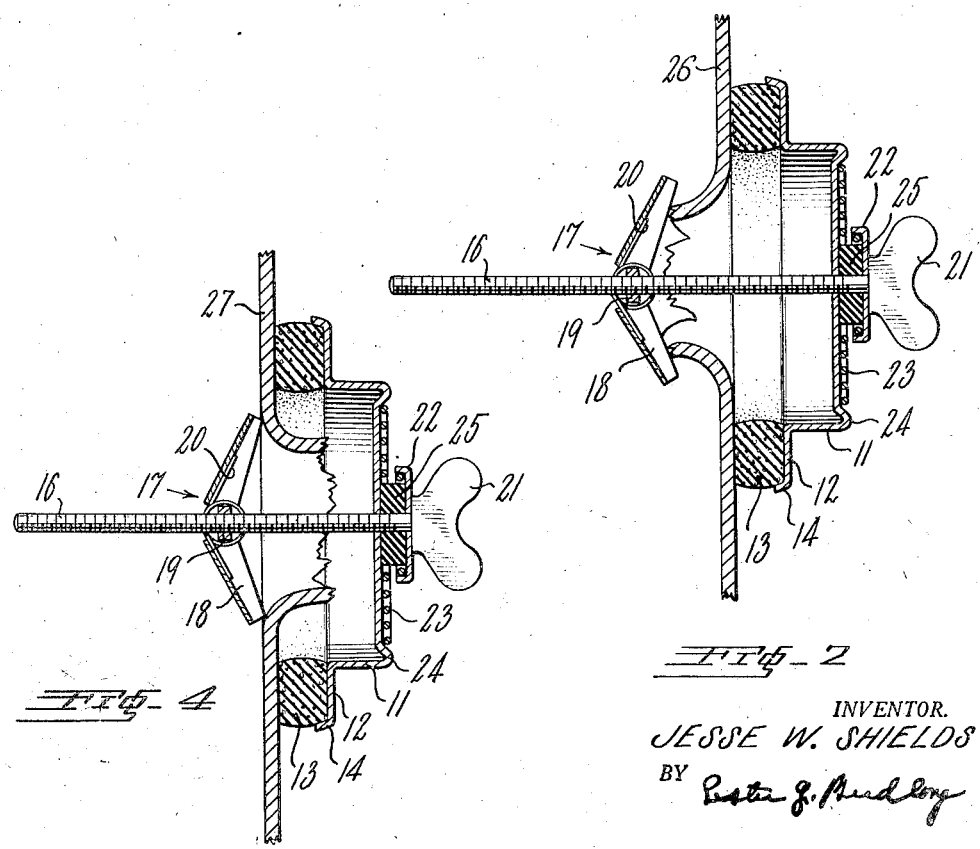
Fig. 2
Fig. 4
INVENTOR.
JESSE W. SHIELDS
BY
ATTORNEY Patented July 18, 1944

2,354,069

UNITED STATES PATENT OFFICE 2,354,069

REPAIR DEVICE

Jesse W. Shields, Grosse Pointe, Mich., assignor to United States Rubber Company, New York, N. Y., a corporation of New Jersey Application April 21, 1943, Serial No. 483,937

1 Claim. (Cl. 220—25)

This invention relates to a repair patch for tanks or similar containers and in particular it relates to a quick acting temporary repair device adapted to seal a container when punctured by some object such as a projectile.

In order to provide a repair device for containers which will function expeditiously it is desirable that the repair device be constructed in such a manner that it may be easily and quickly inserted and attached to the punctured area of the containers. Containers whether they are for fuel, oil or water, associated with automotive or air vehicles, or containers used for storage purposes are especially vulnerable to rifle or machine gun fire. There are available certain patches and repair devices which may be appropriated for sealing such containers. However, such prior repair devices have been objectionable because of the length of time required for the repair to be made. The present invention has for one of its principal purposes the ability to seal a puncture quickly and thus reduced loss of fluid from the container.

Among the objects of my invention are to provide a repair device for containers which may be quickly and easily applied; to provide a repair device which will adjust itself to various contours with which it is engageable; to provide a repair device which may be applied without the necessity of trimming or removing the flared wall surrounding the punctured area; to provide a repair device which will spring into operative position as quick as a portion of the device may be manually inserted into the punctured opening; and to provide a device which in combination with its capabilities is simple in construction and economical of manufacture. These and other objects and advantages will appear more fully in the following detailed description when considered in connection with the accompanying drawing in which:

Fig. 1 is a perspective view partly in section of a repair device which is illustrative of the present invention;

Fig. 2 is a transverse view in section of the repair device in operative position with a portion of a container wall;

Fig. 3 is a fragmentary view showing a portion of the repair device and its relationship with punctured tank wall illustrating that the device may be inserted quickly; and Fig. 4 is a transverse view in section of the repair device in engagement with a modified form of ruptured wall.

With reference to the drawing, and in particular to Figs. 1 and 2, I show an embodiment of my invention in the form of a sealing device consisting essentially of a cup shaped member 11 formed of metal, fiber or synthetic resin material. Preferably the cup member is round although it may be in the form of an oval or other desired shape. The ledge 12 forms a continuation of the cup edge and provides a flat surface against which a sealing annulus 13 may be secured. A rim 14 extending axially from the outer edge of the ledge 12 provides means for positioning and assisting in the retention of the sealing material 13. Preferably the sealing material 13 is formed of soft cellular rubber cemented to the ledge 12. While other sealing materials may be used in place of the cellular rubber, I find it is very desirable to use a soft material such as cellular rubber so that the sealing strip will shape itself to accommodate the various contours against which it may be pressed. Good results have been obtained by providing a sealing strip 13 of soft cellular rubber having cross-sectional dimensions of approximately ½ inch square.

Extending axially through the cup shaped member 11 is an aperture 15 through which a threaded rod 16 is slidable. At one end of the threaded rod 16 is mounted in threaded relationship a toggle assembly 17. This toggle assembly is of conventional construction for miscellaneous fastening devices. Essentially it consists of a pair of U-shaped members 18 pivotally mounted on a nut 19 which is associated in threaded engagement with the rod 16. It is to be understood that other conventional toggle units may be used for this purpose. A spring 20 normally maintains the toggle members in their outward position.

At the opposite end of the threaded rod 16 is a wing member 21 secured to the rod 16. A cupped shaped washer 22 is also attached to the rod 16 and to the wing member 21. A light spring 23 of increasing spiral dimensions is confined between the cupped washer 22 and the cupped member 11. A raised portion 24 is formed at the junction of the sides and base of the cupped member 11 so as to provide a restraining and centering guide for the spring 23. A washer 25 of sealing material lies on the threaded rod 16 between the cupped washer 22 and the cupped member 24. The purpose of this washer is to seal any leakage which may occur around the aperture 15 through which the rod 16 extends.

Fig. 2 illustrates the repair device in operative position with a punctured container wall 26, When the toggle members 18 pass through a restricted aperture, such as that illustrated in Fig. 3, the toggle members are forced together by the walls surrounding the punctured hole and expand by means of the spring 20 after the toggle members have completely passed through the hole. By the use of a toggle device of this kind the repair device may be located in a preliminary sealing position by merely thrusting the toggle axially through the punctured wall. When this has been accomplished the spring 23 urges the sealing ring 13 against the container wall before the threaded rod 16 is turned a sufficient number of times to mechanically press the sealing strip 13 against the wall. The advantage of the spring therefore is that at least a partial sealing effect takes place instantaneously upon the insertion of the toggle member through the punctured wall. Thereafter the operator may more leisurely thread the rod 16 through the toggle so as to compress the sealing strip 13 tightly against the tank wall 26. It will be noted in Fig. 2 that the spring 23 collapses in such a way that it does not interfere with the tightening between the rod and the toggle. When the repair device is in its final tightened position the washer 25 engages the face of the cupped member 11 and effectively seals the area surrounding the aperture 15. As shown in Fig. 4, I have illustrated the repair device associated with a tank wall 27 in a manner in which the tank wall is flared outwardly due to the puncture. In this case the cup shaped member 11 functions as a spacer to provide clearance for the outwardly projecting portion of the tear formed in the wall 27.

From the foregoing it is believed apparent that I have provided a novel device for quickly and efficiently stopping leaks and sealing containers and while I have shown a preferred embodiment of my invention it is to be understood that I contemplate those variations which appear obviously within the scope of the invention and as defined in the scope of the appended claim.

Having thus described my invention, what I claim and desire to protect by Letters Patent is:

A repair device for sealing flared holes in containers comprising a cup-shaped member having a laterally extending flange on its open face constituting a seat, a soft resilient sealing ring secured to said seat and leaving the radially outer portions of the interior of the cup-shaped member unobstructed, the combined depth of the cup-shaped member and the thickness of the sealing ring being sufficient to normally clear the flared edges of the hole in the container when the device is in operative position, a threaded rod extending axially through the cup-shaped member, an expansible toggle threaded to one end of said rod adjacent the open end of the cup-shaped member, a thumb wing attached to the opposite end of said rod, a spiral-helical spring interposed between the thumb wing and the cup-shaped member, and a projecting portion raised from the base of the cup-shaped member for centering and retaining the spiral-helical spring.

JESSE W. SHIELDS.